United States Patent
Li et al.

(10) Patent No.: US 11,794,270 B2
(45) Date of Patent: Oct. 24, 2023

(54) SYSTEM AND METHOD OF MANUFACTURING A RESISTANCE SPOT WELD OF WORKPIECES

(71) Applicant: GM Global Technology Operations LLC, Detroit, MI (US)

(72) Inventors: Huaxin Li, Rochester Hills, MI (US); MingFeng Shi, West Bloomfield, MI (US); Jatinder Paul Singh, Troy, MI (US); Dale A. Gerard, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 17/307,277

(22) Filed: May 4, 2021

(65) Prior Publication Data
US 2022/0355410 A1    Nov. 10, 2022

(51) Int. Cl.
*B23K 11/16* (2006.01)
*B23K 11/11* (2006.01)
(Continued)

(52) U.S. Cl.
CPC .......... *B23K 11/166* (2013.01); *B23K 11/115* (2013.01); *B23K 11/20* (2013.01);
(Continued)

(58) Field of Classification Search
CPC ..... B23K 11/166; B23K 11/115; B23K 11/24; B23K 35/0255; B23K 35/3033; B23K 11/20; B23K 2103/04; C22C 19/03
(Continued)

(56) References Cited

U.S. PATENT DOCUMENTS

| | | | |
|---|---|---|---|
| 5,783,794 A * | 7/1998 | Oikawa | B23K 11/115 |
| | | | 219/94 |
| 2008/0102308 A1* | 5/2008 | Doira | B23K 11/185 |
| | | | 428/653 |

(Continued)

FOREIGN PATENT DOCUMENTS

| CN | 102672332 A | 9/2012 |
|---|---|---|
| CN | 110449716 A | 11/2019 |
| EP | 1679147 A2 | 7/2006 |

*Primary Examiner* — John J Norton
*Assistant Examiner* — Simpson A Chen
(74) *Attorney, Agent, or Firm* — Vivacqua Crane PLLC

(57) ABSTRACT

A system for increasing joint strength and reducing embrittlement in a resistance spot weld of metal workpieces is disclosed. The system comprises a stackup of first and second metal workpieces, and an interface member disposed between the first and second metal workpieces. The interface member comprises a peripheral wall defining a hollow inner portion. The peripheral wall has a first open end extending to a second open end. The first open end is in contact with the first metal workpiece defining a first weld portion thereon. The second open end is in contact with the second metal workpiece defining a second weld portion thereon. The system further comprises a first electrode configured to contact the first metal workpiece to heat the peripheral wall at the first weld portion and join the first metal workpiece with the first open end of the peripheral wall. The system further comprises a second electrode configured to contact the second metal workpiece to heat the peripheral wall at the second weld portion and join the second metal workpiece with the second open end of the peripheral wall to define a weld joint. The system further comprises a power source configured to power the first and second electrodes and a controller configured to control the power to the first and second electrodes to heat the peripheral wall.

15 Claims, 3 Drawing Sheets

(51) Int. Cl.
  *B23K 11/24* (2006.01)
  *B23K 35/02* (2006.01)
  *C22C 19/03* (2006.01)
  *B23K 35/30* (2006.01)
  *B23K 11/20* (2006.01)
  *B23K 103/04* (2006.01)

(52) U.S. Cl.
  CPC .......... *B23K 11/24* (2013.01); *B23K 35/0255* (2013.01); *B23K 35/3033* (2013.01); *C22C 19/03* (2013.01); *B23K 2103/04* (2018.08)

(58) Field of Classification Search
  USPC ....................................................... 219/86.7
  See application file for complete search history.

(56) References Cited

U.S. PATENT DOCUMENTS

| | | | | |
|---|---|---|---|---|
| 2015/0104243 | A1* | 4/2015 | Watanabe | B23K 11/11 403/271 |
| 2015/0352658 | A1* | 12/2015 | Yang | B23K 11/115 219/91.2 |
| 2017/0297134 | A1* | 10/2017 | Sigler | B23K 35/002 |
| 2019/0314915 | A1 | 10/2019 | Wang et al. | |
| 2020/0114459 | A1* | 4/2020 | Haselhuhn | B23K 11/20 |
| 2021/0260704 | A1* | 8/2021 | Hu | B23K 11/20 |

* cited by examiner

SYSTEM AND METHOD OF MANUFACTURING A RESISTANCE SPOT WELD OF WORKPIECES

INTRODUCTION

The present disclosure relates to joining metal workpieces for automotive components or other industry components and, more particularly, systems and methods of manufacturing resistance spot welds of metal workpieces having reduced embrittlement and increased joint strength.

Many automobile body parts or other industry parts are manufactured with workpieces joined by resistance spot welding. Some current systems and methods of resistance spot welding may bring undesirable tension and mechanical stress on the workpieces. Some current systems and methods may further have a relatively large operational heat-affected zone (HAZ). As a result, such systems and methods may cause surface cracks on the workpiece joints and allow elements, e.g., zinc, of the workpieces therein, causing liquid metal embrittlement (LME) thereby weakening the workpiece. Further tension thereon may pull apart the workpieces.

SUMMARY

Thus, while current system and methods achieve their intended purpose, there is a need for a new and improved system and method for manufacturing a resistance spot weld of metal workpieces having reduced embrittlement and increased joint strength.

According to one aspect of the present disclosure, a method of manufacturing a resistance spot weld of metal workpieces having increased joint strength and reduced embrittlement is provided. The method comprises providing a stackup comprising a first metal workpiece and a second metal workpiece. The first metal workpiece includes a first material and the second metal workpiece includes a second material. The stackup further comprises an interface member disposed between the first and second metal workpieces. The interface member comprises a peripheral wall defining a hollow inner portion being a void. The peripheral wall has a first open end extending to a second open end. The first open end is in contact with the first metal workpiece defining a first weld portion thereon. The second open end is in contact with the second metal workpiece defining a second weld portion thereon.

In this aspect, the method further comprises heating the peripheral wall of the interface member. The peripheral wall is heated at the first weld portion to join the first metal workpiece with the first open end and at the second weld portion to join the second metal workpiece to the second open end. The joining of the first metal workpiece with the first open end and the second metal workpiece to the second open end defines a weld joint having an inner void, thereby reducing workpiece embrittlement and enhancing weld strength.

In an example, one of the first and second metal workpieces is a steel sheet having a tensile strength of at least 780 MPa. In this example, each of the first and second metal workpieces comprises a zinc-based coating disposed thereabout, the zinc-based coating being 30 g/m² to 120 g/m² zinc.

In another example, the interface member comprises between 8 weight percent and 100 weight percent nickel. In yet another example, the interface member comprises 0.13 weight percent carbon, 1.7 weight percent manganese, 0.04 weight percent aluminum, 0.5 weight percent silicon, 0.02 phosphorus, and 0.002 sulfur.

In yet another example of this aspect, the step of heating the peripheral wall comprises applying a pre-load to the first weld portion of the first metal workpiece and to the second weld portion of the second metal workpiece. Moreover, the step of heating further comprises passing current at the first and second weld portions to heat the peripheral wall. Additionally, the step of heating comprises melting the peripheral wall to join the first metal workpiece with the first open end and to join the second metal workpiece with the second open end. Furthermore, the step of heating comprises applying an upset force to the first and second weld portions to define the weld joint.

In still another embodiment, the step of heating comprises heating the peripheral wall with first and second electrodes. The first electrode is configured to contact the first weld portion and the second electrode is configured to contact the second weld portion to heat the peripheral wall. The first electrode has a first flat end to contact the first weld portion and the second electrode has a second flat end to contact the second weld portion.

In another example of this aspect, the peripheral wall has a circumferential area that is equal to or less than a surface area of each of the first and second flat ends. In yet another example, the peripheral wall has an outer diameter of between 4 millimeters and 20 millimeters. In still another example, the peripheral wall has a thickness between the first and second open end of 0.1 millimeters to 3 millimeters. In yet another example of this aspect, the peripheral wall has a thickness between the first and second open end of 0.4 millimeters to 0.8 millimeters. In still another example, the peripheral wall has a thickness between the first and second open end of 0.5 millimeters.

In another aspect of the present disclosure, a system for manufacturing a resistance spot weld of metal workpieces having increased joint strength and reduced embrittlement is provided. The system comprises a stackup of first and second metal workpieces. The first metal workpiece includes a first material and the second metal workpiece including a second material.

In this aspect, the system further comprises an interface member disposed between the first and second metal workpieces. The interface member comprises a peripheral wall defining a hollow inner portion being a void. In this aspect, the peripheral wall has a first open end extending to a second open end. The first open end is in contact with the first metal workpiece defining a first weld portion thereon. The second open end is in contact with the second metal workpiece defining a second weld portion thereon.

Moreover, the system comprises a first electrode configured to contact the first metal workpiece to heat the peripheral wall at the first weld portion and join the first metal workpiece with the first open end of the peripheral wall. The system further comprises a second electrode configured to contact the second metal workpiece to heat the peripheral wall at the second weld portion and join the second metal workpiece with the second open end of the peripheral wall to define a weld joint having an inner void for reducing workpiece embrittlement and enhancing weld strength.

Additionally in this aspect, the system comprises a power source configured to power the first and second electrodes and a controller configured to control the power to the first and second electrodes to heat the peripheral wall.

In one embodiment of this aspect, one of the first and second metal workpieces is a steel sheet having a tensile strength of at least 780 MPa. In this example, each of the first and second metal workpieces comprises a zinc-based coating disposed thereabout, the zinc-based coating being 30 g/m² to 120 g/m² zinc.

In another embodiment, the interface member comprises between 8 weight percent and 100 weight percent nickel. In yet another embodiment, the interface member comprises 0.13 weight percent carbon, 1.7 weight percent manganese, 0.04 weight percent aluminum, 0.5 weight percent silicon, 0.02 phosphorus, and 0.002 sulfur.

In yet another example of this aspect, the step of heating comprises heating the peripheral wall with first and second electrodes. The first electrode is configured to contact the first weld portion and the second electrode configured to contact the second weld portion to heat the peripheral wall. The first electrode has a first flat end to contact the first weld portion. The second electrode has a second flat end to contact the second weld portion.

In another embodiment of this aspect, the peripheral wall has a circumferential area that is equal to or less than a surface area of each of the first and second flat ends. In one embodiment, the peripheral wall has an outer diameter of between 4 millimeters and 20 millimeters. In yet another embodiment, the peripheral wall has a thickness between the first and second open end of 0.1 millimeters to 3 millimeters. In still another embodiment, the peripheral wall has a thickness between the first and second open end of 0.4 millimeters to 0.8 millimeters. In yet another embodiment, the peripheral wall has a thickness between the first and second open end of 0.5 millimeters.

In another aspect of the present disclosure, a resistance spot welded stackup having increased joint strength and reduced embrittlement is provided. The stackup comprises a first metal workpiece and a second metal workpiece, the first metal workpiece including a first material and the second metal workpiece including a second material.

The stackup further comprises a welded interface member disposed between the first and second metal workpieces. The welded interface member comprises a welded peripheral wall defining a hollow inner portion being a void. The welded peripheral wall has a first open end extending to a second open end. The first open end is welded to the first metal workpiece defining a first welded portion thereon. The second open end is welded to the second metal workpiece defining a second welded portion thereon.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides systems and methods for manufacturing a resistance spot weld of metal workpieces for increased joint strength and reduced embrittlement. The systems and methods disclosed herein provide ways to minimize heat-affected zones where current density is concentrated thereby increasing weld strength and reducing liquid metal embrittlement of welded metal workpieces. A stackup of first and second workpieces to be resistance spot welded comprises an interface member disposed between the workpieces. The interface member has a peripheral wall defining a hollow inner portion. The peripheral wall with the hollow portion allows for current density to be concentrated on the peripheral wall, lessening the heat-affected zone during welding. In turn, weld strength is increased and workpiece embrittlement is reduced. Furthermore, the present disclosure provides system and methods of manufacturing a resistance spot weld wherein relatively less current density is used with relatively less force.

Figure 1A:
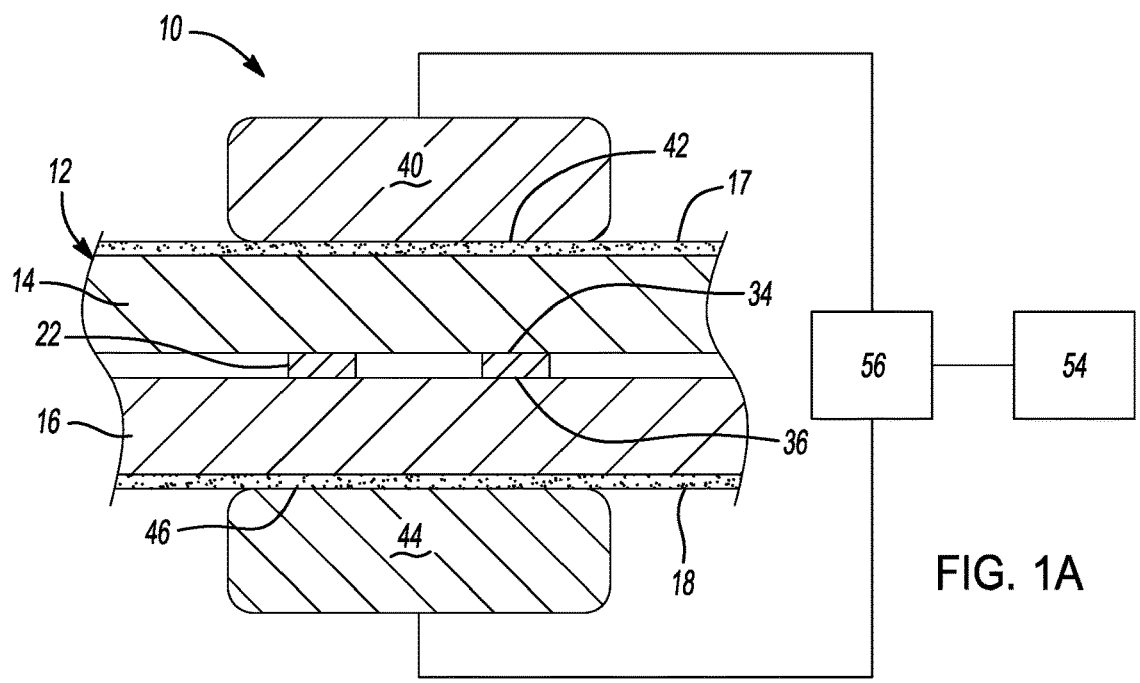
FIG. 1A is a schematic view of a system for manufacturing a resistance spot weld of metal workpieces having increased joint strength and reduced embrittlement in accordance with one embodiment of the present disclosure.
Figure 1B:
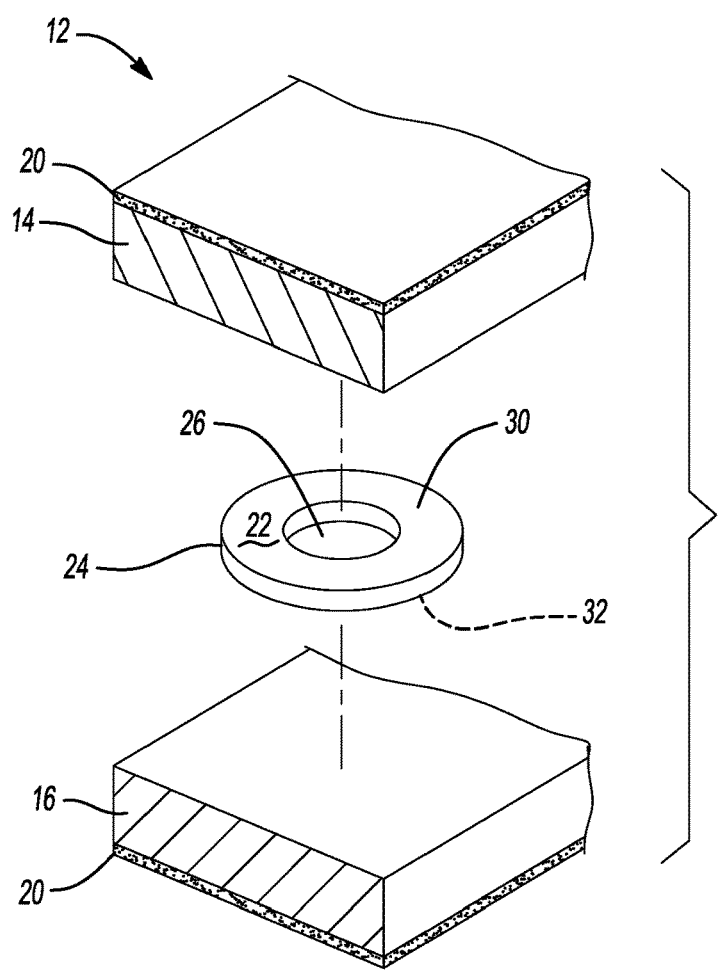
FIG. 1B is an exploded view of a stackup of metal workpieces having an interface member of the system in FIG. 1A.

In accordance with one embodiment of the present disclosure, FIGS. 1A and 1B illustrate a system 10 for manufacturing a resistance spot weld of metal workpieces having increased joint strength and reduced embrittlement. As shown, the system 10 comprises a stackup 12 of first and second metal workpieces. The first metal workpiece 14 includes a first material and the second metal workpiece 16 includes a second material. The first metal workpiece 14 defines a negative side 17 and the second metal workpiece 16 defines a positive side 18 of the stackup 12.

Although FIGS. 1A and 1B depict the stackup 12 having first and second metal workpieces 14, 16, it is to be understood that any plurality of workpieces may comprise the stackup without departing from the spirit or scope of the present disclosure. For example, the stackup may comprise three or four metal workpieces as desired.

Preferably, the first material is comprised of the same components as the second material. However, it is to be understood that the first material may be comprised of different components than the second material without departing from the spirit or scope of the present disclosure.

In one example, the first and second materials is steel. In this embodiment, one of the first and second metal workpieces 14, 16 is a steel sheet having a tensile strength of at least 780 MPa. Moreover, each of the first and second metal workpieces 14, 16 comprises a zinc-based coating disposed thereabout. In this embodiment, the zinc-based coating may be 30 g/m² to 120 g/m² zinc in weight.

As mentioned above, the steel workpieces may be coated with a zinc coating 20. During resistance spot welding, melting zinc during welding is a source for liquid metal embrittlement. For hot dip galvanized coating, the zinc coating 20 may comprise a minimum of 40 g/m², 50 g/m², 60 g/m², 70 g/m², 80 g/m², or 90 g/m² of zinc weight. For hot dip galvannealed coating, the zinc coating 20 may have a minimum weight of 45 g/m² or 52 g/m² zinc. For electrogalvanized or electro-galvannealed coating, the zinc coating 20 may have a minimum weight of 36 g/m², 47 g/m², 50 g/m², 60 g/m², 70 g/m², 80 g/m², or 90 g/m² zinc.

It is to be understood that any other suitable coating may be used to coat the steel workpieces without departing from the spirit or scope of the present disclosure. Moreover, the figures herein depict the zinc coating 20 on one side of each of the workpieces 14, 16. However, it is to be understood that the zinc coating may be on both sides of each workpieces 14, 16 without departing from the spirit or scope of the present disclosure.

As shown in FIGS. 1A and 1B, the system 10 further comprises an interface member 22 disposed between the first and second metal workpieces. The interface member 22 comprises a peripheral wall 24 defining a hollow inner portion 26 being a void. In this embodiment, the peripheral wall 24 has a first open end extending to a second open end 32. Preferably, the interface member 22 may take on a shape of a ring with the hollow inner portion 26. However, the interface member 22 may take on any suitable shape having the hollow inner portion 26 without departing from the spirit or scope of the present disclosure.

Referring to FIGS. 1A and 1B, the first open end is in contact with the first metal workpiece 14 defining a first weld portion or first faying portion 34 thereon. The first weld portion 34 is the portion or zone of the first metal workpiece 14 that comes in contact with the first open end to be welded. The second open end 32 is in contact with the second metal workpiece 16 defining a second weld portion or second faying portion 36 thereon. The second weld portion 36 is the portion or zone of the second metal workpiece 16 that comes in contact with the second open end 32 to be welded.

In one embodiment, the interface member 22 comprises nickel. Preferably, but not necessarily, the interface member 22 comprises between 8 weight percent and 100 weight percent nickel. Other components of the interface member 22 may include 0 to 1.5 weight percent carbon, 0 to 15 weight percent manganese, 0 to 20 weight percent chromium, 0 to 2 weight percent silicon, 0 to 2 weight percent molybdenum, and 0 to 2 weight percent aluminum.

In another embodiment, the interface member 22 may comprise steel. It is to be understood that the interface member 22 may comprise a composition which is the same as the composition of any steel sheet known in the art without departing from the spirit or scope of the present disclosure. For example, the interface member may comprise 0.13 weight percent carbon, 1.7 weight percent manganese, 0.04 weight percent aluminum, 0.5 weight percent silicon, 0.02 phosphorus, and 0.002 sulfur.

Moreover, the peripheral wall 24 has an outer diameter of between 4 millimeters and 20 millimeters, between 10 millimeters and 15 millimeters, or 12.5 millimeters. Additionally, the peripheral wall 24 may have a thickness between the first and second open ends 32 of 0.1 millimeters to 3 millimeters, preferably 0.4 millimeters to 0.8 millimeters, and more preferably 0.5 millimeters.

Figure 2:
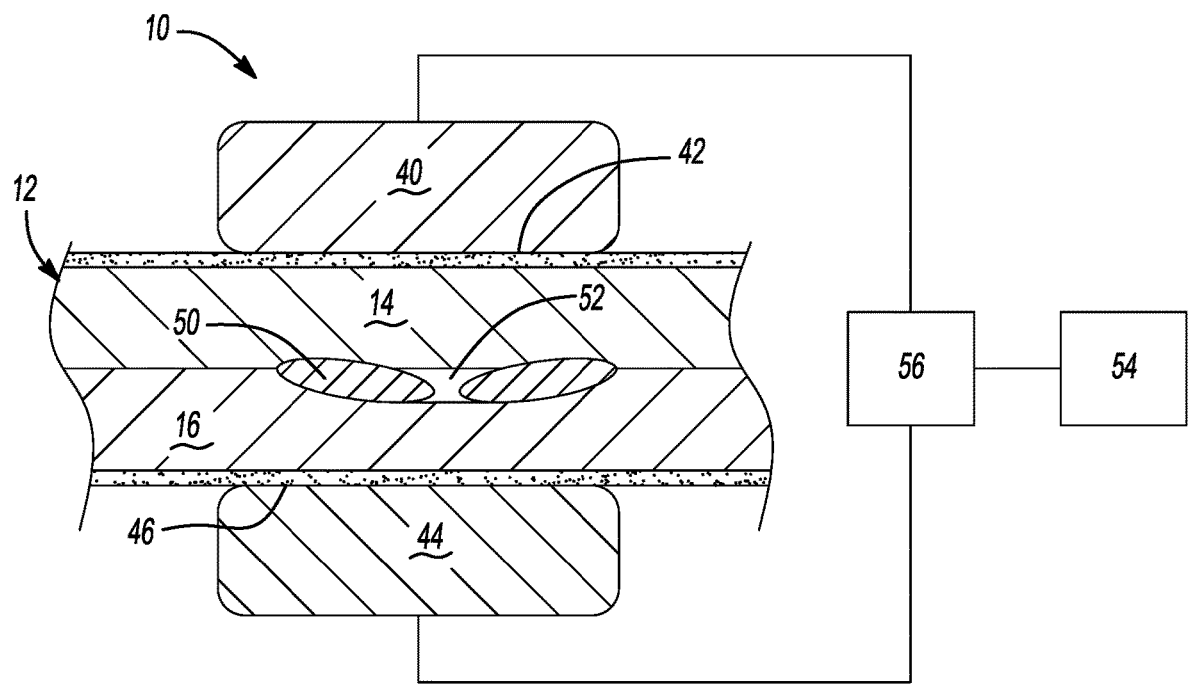
FIG. 2 is a schematic view of the system of FIG. 1A with the metal workpieces having a joint weld.

As depicted in FIGS. 1A to 2, the system 10 comprises a first electrode 40 having a first flat contact or end 42 arranged to contact the first metal workpiece at the first weld portion 34 to thereby heat the first end of the peripheral wall 24. The system 10 further comprises a second electrode 44 having a second flat contact or end 46 arranged to contact the second metal workpiece 16 at the second weld portion 36 to thereby heat the second end of the peripheral wall 24.

As shown, each of the first and second flat contacts 42, 46 has a flat shape to facilitate a concentration of current density on the first and second ends of the peripheral wall 24.

Moreover, each of the first and second flat contacts 42, 46 has a contact surface area. Further, each of the first and second ends of the peripheral wall 24 encompasses a peripheral area. Preferably, the peripheral area is equal to or less than the contact surface area. For example, as discussed above, the interface member 22 may take on a shape of a ring. In such embodiment, the peripheral wall 24 has a circumferential area (peripheral area) that is equal to or less than the contact surface area of each of the first and second flat contacts.

As shown, the first electrode 40 is configured to contact the negative side 17 of the stackup 12 and the second electrode 44 is configured to contact the positive side 18 of the stackup 12 at the first and second weld portions, respectively. When powered, the first and second electrodes 40, 44 pass current through the first and second metal workpieces 14, 16 to the peripheral wall 24, allowing the peripheral wall 24 to heat and melt. As shown in FIG. 2, heating the peripheral wall 24 at the first and second weld portions define a weld joint 50 having an inner void 52 for reducing workpiece embrittlement and enhancing weld strength. That is, workpiece embrittlement is reduced and weld strength is enhance due to a concentration of current density on the peripheral wall 24. In turn, less embrittlement caused by melting zinc, for example, provides a workpiece with more strength.

Melting the peripheral wall 24 joins each of the first and second metal workpieces 14, 16 with the first and second open ends 30, 32 at the first and second weld portions, respectively. Thus, along with a mechanical load mechanism (not shown), the first and second electrodes 40, 44 are configured to heat and melt the peripheral wall 24, thereby joining each of the first and second metal workpieces 14, 16 with the first and second open ends 32 of the peripheral wall 24, respectively.

In accordance with this embodiment, the system 10 further comprises a power source 54 configured to power the first and second electrodes 40, 44 as illustrated in FIGS. 1A and 2. As shown, the power source 54 is connected to the first and second electrodes. Moreover, the system 10 comprises a controller 56 in communication with the power source 54 and is configured to control the power to the first and second electrodes 40, 44 to heat the peripheral wall 24.

As depicted in FIGS. 1A and 1B, the interface member 22 may be disposed or inserted between the first and second metal workpieces. That is, the interface member 22 may be a separate member from the first and second metal workpieces. Moreover, in this example, the interface member 22 is comprised of different components than the first and second metal workpieces 14, 16 as discussed above.

Figure 3:
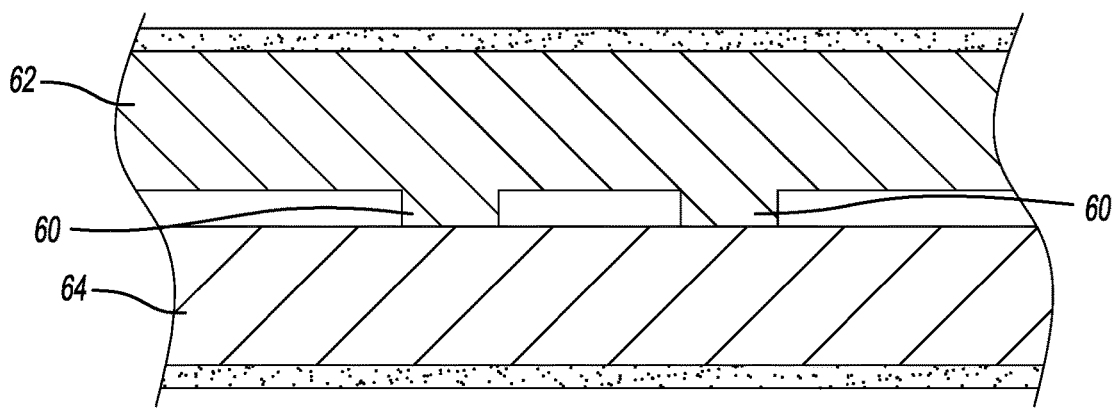
FIG. 3 is a cross-sectional side view of a stackup for a resistance spot weld of metal workpieces in accordance with one embodiment of the present disclosure.

In another embodiment shown in FIG. 3, an interface member 60 is formed from at least one of the first and second metal workpieces 62, 64. As such, the interface member 60 is formed integrally with at least one of the first and second metal workpieces 62, 64. That is, the interface member 60 is formed as one part with at least one of the first and second metal workpieces 62, 64. As shown in FIG. 3, the interface member 60 is integrally as one part with the first metal workpiece 62. Furthermore, in this example, the interface member 60 is comprised of the same material of first metal workpiece 62.

Figure 4:
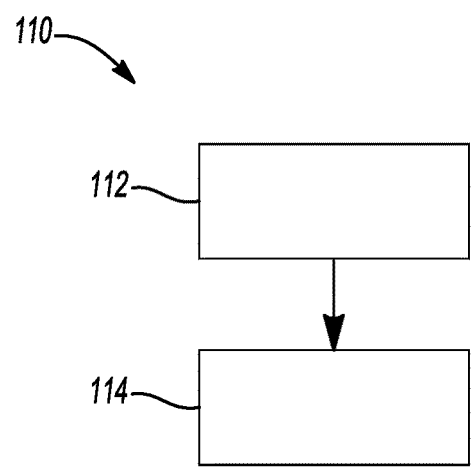
FIG. 4 is a flowchart of a method of manufacturing a resistance spot weld of metal workpieces implementing the system of FIG. 1A in accordance with one embodiment of the present disclosure.

In accordance with one example of the present disclosure, FIG. 4 depicts a method 110 of manufacturing a resistance spot weld of metal workpieces having increased joint strength and reduced embrittlement. The method 110 comprises in box 112 a step of providing a stackup 12 having a first metal workpiece 14 and a second metal workpiece 16 as illustrated in FIG. 1. As discussed above, the first metal workpiece 14 includes a first material and the second metal workpiece 16 includes a second material. Preferably, the first material is comprised of the same components as the second material. However, it is to be understood that the first material may be comprised of different components than the second material without departing from the spirit or scope of the present disclosure.

In one example, the first and second materials are steel. In this embodiment, one of the first and second metal workpieces 14, 16 is a steel sheet having a tensile strength of at least 780 MPa. Moreover, each of the first and second metal workpieces 14, 16 comprises a zinc-based coating disposed thereabout. In this embodiment, the zinc-based coating may be 30 g/m$^2$ to 120 g/m$^2$ zinc in weight.

As mentioned above, the steel workpieces may be coated with a zinc coating 20. During resistance spot welding, melting zinc during welding is a source for liquid metal embrittlement. For hot dip galvanized coating, the zinc coating 20 may comprise 40 g/m$^2$, 50 g/m$^2$, 60 g/m$^2$, 70 g/m$^2$, 80 g/m$^2$, and 90 g/m$^2$ of zinc weight. For hot dip galvannealed coating, the zinc coating 20 may have a weight of 45 g/m$^2$ and 52 g/m$^2$ zinc. For electrogalvanized or electrogalvannealed coating, the zinc coating 20 may have a weight of 36 g/m$^2$, 47 g/m$^2$, 50 g/m$^2$, 60 g/m$^2$, 70 g/m$^2$, 80 g/m$^2$, and 90 g/m$^2$ zinc. It is to be understood that any other suitable coating may be used to coat the steel workpieces without departing from the spirit or scope of the present disclosure.

The stackup 12 further comprises an interface member 22 (FIG. 1) disposed between the first and second metal workpieces. As discussed above, the interface member 22 comprises a peripheral wall 24 defining a hollow inner portion 26 being a void. Moreover, the peripheral wall 24 has a first open end extending to a second open end 32. The first open end is in contact with the first metal workpiece 14 defining a first weld portion 34 thereon. The second open end 32 is in contact with the second metal workpiece 16 defining a second weld portion 36 thereon.

In one embodiment, the interface member 22 comprises nickel. Preferably, but not necessarily, the interface member 22 comprises between 8 weight percent and 100 weight percent nickel. Other components of the welded interface member 22 may include 0 to 1.5 weight percent carbon, 0 to 15 weight percent manganese, 0 to 20 weight percent chromium, 0 to 2 weight percent silicon, 0 to 2 weight percent molybdenum, and 0 to 2 weight percent aluminum.

In another embodiment, the interface member 22 may comprise steel. It is to be understood that the interface member 22 may comprise a composition which is the same as the composition of any known steel sheet without departing from the spirit or scope of the present disclosure. For example, the interface member may comprise 0.13 weight percent carbon, 1.7 weight percent manganese, 0.04 weight percent aluminum, 0.5 weight percent silicon, 0.02 phosphorus, and 0.002 sulfur.

Moreover, the peripheral wall 24 has an outer diameter of between 4 millimeters and 20 millimeters, between 10 millimeters and 15 millimeters, or 12.5 millimeters. Additionally, the peripheral wall 24 may have a thickness between the first and second open ends 30, 32 of 0.1 millimeters to 3 millimeters, preferably 0.4 millimeters to 0.8 millimeters, and more preferably 0.5 millimeters.

Referring to FIG. 4, the method 110 further comprises in box 114 a step of heating the peripheral wall 24 of the interface member 22. The step of heating the peripheral wall 24 is preferably accomplished by way of the first and second electrodes 40, 44 of the system 10 in FIG. 1. That is, the first electrode 40 is configured to contact the first weld portion 34 and the second electrode 44 is configured to contact the second weld portion 36 to heat the peripheral wall 24.

The peripheral wall 24 is heated at the first weld portion 34 to join the first metal workpiece 14 with the first open end and at the second weld portion 36 to join the second metal workpiece with the second open end 32. As discussed above, the joining of the first metal workpiece 14 with the first open end and the second metal workpiece 16 with the second open end 32 defines a weld joint 50 (FIG. 2) having an inner void, thereby reducing workpiece embrittlement and enhancing weld strength. That is, workpiece embrittlement is reduced and weld strength is enhance due to a concentration of current density on the peripheral wall 24. In turn, less embrittlement caused by melting zinc, for example, provides a workpiece with more strength.

In one example, the step of heating the peripheral wall 24 may comprises applying a pre-load to the first weld portion 34 of the first metal workpiece 14 and to the second weld portion 36 of the second metal workpiece. The pre-load may be accomplished by way of any suitable mechanical load mechanism (not shown). Moreover, the step of heating may further comprise passing current at the first and second weld portions to heat the peripheral wall 24. Passing current to heat the peripheral wall 24 may be accomplished with the first and second electrodes 40, 44 by way of the power source 54 and the controller 56 of the system 10 in FIG. 1.

Additionally, the step of heating may comprise melting the peripheral wall 24 to join the first metal workpiece 14 with the first open end and to join the second metal workpiece 16 with the second open end 32. Melting occurs when the peripheral wall 24 is heated by the electrodes. Furthermore, the step of heating comprises applying an upset force to the first and second weld portions, defining the weld joint. The upset force may be by the mechanical load mechanism discussed above or any other suitable mechanism to move the electrodes inward against the metal workpieces thereby keeping the weld joint 50 in place between the workpieces at the first and second weld portions.

Figure 5:
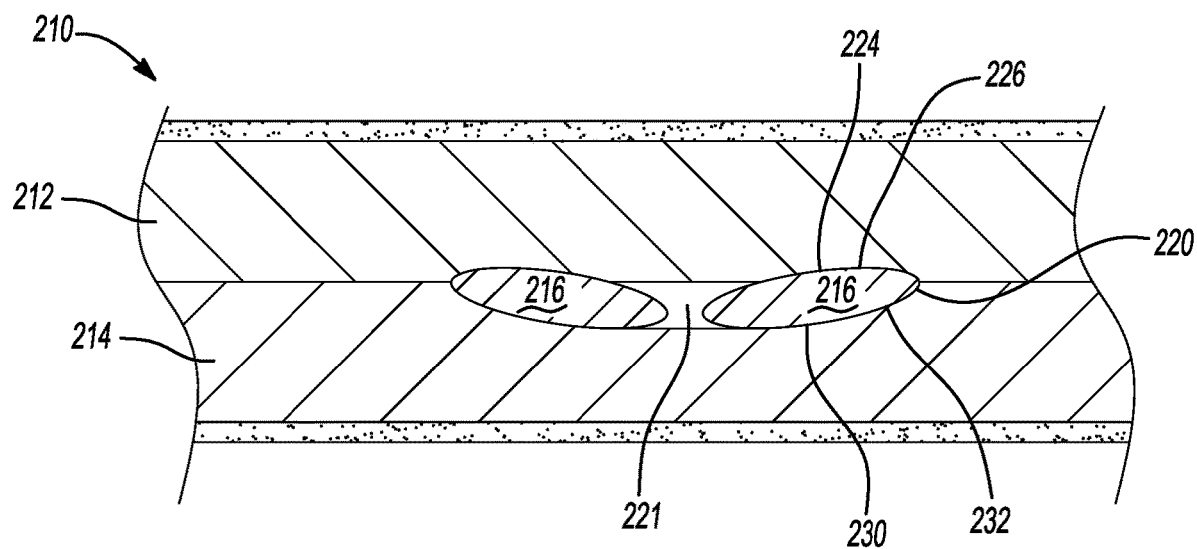
FIG. 5 is a cross-sectional side view of a resistance spot weld of metal workpieces manufactured by the method of FIG. 3.

In accordance with another embodiment of the present disclosure, FIG. 5 illustrates a resistance spot welded stackup 210 of metal workpieces having increased joint strength and reduced embrittlement. In this embodiment, the resistance spot welded stackup 210 is manufactured by the system 10 of FIG. 1A and the method 110 of FIG. 4. As shown, the stackup 210 comprises a first metal workpiece 212 and a second metal workpiece 214. The first metal workpiece 212 includes a first material and the second metal workpiece 214 includes a second material.

In one example, the first and second materials are steel. In this embodiment, one of the first and second metal workpieces 212, 214 is a steel sheet having a tensile strength of at least 780 MPa. Moreover, each of the first and second metal workpieces 212, 214 comprises a zinc-based coating disposed thereabout. In this embodiment, the zinc-based coating may be 30 g/m$^2$ to 120 g/m$^2$ zinc in weight.

As mentioned above, the steel workpieces may be coated with a zinc coating 20. During resistance spot welding, melting zinc during welding is a source for liquid metal embrittlement. For hot dip galvanized coating, the zinc coating may comprise 40 g/m$^2$, 50 g/m$^2$, 60 g/m$^2$, 70 g/m$^2$, 80 g/m$^2$, and 90 g/m$^2$ of zinc weight. For hot dip galvannealed coating, the zinc coating may have a weight of 45 g/m$^2$ and 52 g/m$^2$ zinc. For electrogalvanized or electrogalvannealed coating, the zinc coating may have a weight of 36 g/m$^2$, 47 g/m$^2$, 50 g/m$^2$, 60 g/m$^2$, 70 g/m$^2$, 80 g/m$^2$, and 90 g/m² zinc. It is to be understood that any other suitable coating may be used to coat the steel workpieces without departing from the spirit or scope of the present disclosure.

The stackup further comprises a welded interface member 216 disposed between the first and second metal workpieces 212, 214. The welded interface member 216 comprises a welded peripheral wall 220 defining a hollow inner portion 221 being a void. The welded peripheral wall 220 has a welded first open end 224 extending to a welded second open end 230. The welded first open end 224 is welded to the first metal workpiece 212 defining a first welded portion 226 thereon. The second open end 32 is welded to the second metal workpiece 214 defining a second welded portion 232 thereon.

In this embodiment, the welded interface member 216 comprises nickel. Preferably, but not necessarily, the interface member 216 comprises between 8 weight percent and 100 weight percent nickel. Other components of the welded interface member 22 may include 0 to 1.5 weight percent carbon, 0 to 15 weight percent manganese, 0 to 20 weight percent chromium, 0 to 2 weight percent silicon, 0 to 2 weight percent molybdenum, and 0 to 2 weight percent aluminum.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of manufacturing a resistance spot weld of steel workpieces having increased joint strength and reduced embrittlement, the method comprising:
providing a stackup comprising a first steel workpiece and a second steel workpiece, the first steel workpiece including a first material and the second steel workpiece including a second material, the stackup further comprising a separate interface member disposed between the first and second steel workpieces to be welded between the first and second steel workpieces, the interface member comprising a peripheral wall defining a hollow inner portion being a void, the peripheral wall having a first open end extending to a second open end, the first open end being in contact with the first steel workpiece defining a first weld portion thereon, the second open end being in contact with the second steel workpiece defining a second weld portion thereon; and
heating the peripheral wall of the interface member at the first weld portion to join the first steel workpiece with the first open end and at the second weld portion to join the second steel workpiece to the second open end defining a weld joint having an inner void,
wherein the step of heating comprises heating the peripheral wall with first and second electrodes, the first electrode configured to contact the first weld portion and the second electrode configured to contact the second weld portion to heat the peripheral wall, the first electrode having a first flat end to contact the first weld portion, the second electrode having a second flat end to contact the second weld portion,
wherein the peripheral wall has a circumferential area that is equal to or less than a surface area of each of the first and second flat ends such that current density is concentrated on the peripheral wall, lessening a heat-affected zone during welding and reducing embrittlement of welded steel workpieces to increase weld strength and use relatively less current density.

2. The method of claim 1, wherein one of the first and second steel workpieces has a tensile strength of at least 780 MPa, and wherein each of the first and second steel workpieces comprises a zinc-based coating disposed thereabout, the zinc-based coating being 30 g/m² to 120 g/m² zinc.

3. The method of claim 1, wherein the interface member comprises between 8 weight percent and 100 weight percent nickel.

4. The method of claim 1, wherein the step of heating the peripheral wall comprises:
applying a pre-load to the first weld portion of the first steel workpiece and to the second weld portion of the second steel workpiece;
passing current at the first and second weld portions to heat the peripheral wall;
melting the peripheral wall to join the first steel workpiece with the first open end and to join the second steel workpiece with the second open end;
applying an upset force to the first and second weld portions to define the weld joint.

5. The method of claim 1, wherein the peripheral wall has an outer diameter of between 4 millimeters and 20 millimeters.

6. The method of claim 1, wherein the peripheral wall has a thickness between the first and second open ends of 0.1 millimeters to 3 millimeters.

7. The method of claim 1 wherein the peripheral wall has a thickness between the first and second open ends of 0.4 millimeters to 0.8 millimeters.

8. The method of claim 1, wherein the interface member comprises 0.13 weight percent carbon, 1.7 weight percent manganese, 0.04 weight percent aluminum, 0.5 weight percent silicon, 0.02 phosphorus, and 0.002 sulfur.

9. A system for manufacturing a resistance spot weld of steel workpieces having increased joint strength and reduced embrittlement, the system comprising:
a stackup of first and second steel workpieces, the first steel workpiece including a first material and the second steel workpiece including a second material;
a separate interface member disposed between the first and second steel workpieces to be welded between the first and second steel workpieces, the interface member comprising a peripheral wall defining a hollow inner portion being a void, the peripheral wall having a first open end extending to a second open end, the first open end being in contact with the first steel workpiece defining a first weld portion thereon, the second open end being in contact with the second steel workpiece defining a second weld portion thereon;
a first electrode configured to contact the first steel workpiece to heat the peripheral wall at the first weld portion and join the first steel workpiece with the first open end of the peripheral wall;
a second electrode configured to contact the second steel workpiece to heat the peripheral wall at the second weld portion and join the second steel workpiece with the second open end of the peripheral wall to define a weld joint having an inner void for reducing workpiece embrittlement and enhancing weld strength;
a power source configured to power the first and second electrodes; and a controller configured to control the power to the first and second electrodes to heat the peripheral wall,
wherein the first electrode is configured to contact the first weld portion and the second electrode is configured to contact the second weld portion to heat the peripheral wall, the first electrode having a first flat end to contact the first weld portion, the second electrode having a second flat end to contact the second weld portion, wherein the peripheral wall has a circumferential area that is equal to or less than a surface area of each of the first and second flat ends such that current density is concentrated on the peripheral wall, lessening a heat-affected zone during welding and reducing embrittlement of welded steel workpieces to increase weld strength and use relatively less current density.

10. The method of claim 9, wherein one of the first and second steel workpieces has a tensile strength of at least 780 MPa, and wherein each of the first and second steel workpieces comprises a zinc-based coating disposed thereabout, the zinc-based coating being 30 g/m$^2$ to 120 g/m$^2$ zinc.

11. The method of claim 1, wherein the interface member comprises 0.13 weight percent carbon, 1.7 weight percent manganese, 0.04 weight percent aluminum, 0.5 weight percent silicon, 0.02 phosphorus, and 0.002 sulfur.

12. The system of claim 9, wherein the interface member comprises between 8 weight percent and 100 weight percent nickel.

13. The system of claim 9, wherein the peripheral wall has an outer diameter of between 4 millimeters and 20 millimeters.

14. The method of claim 9, wherein the peripheral wall has a thickness between the first and second open ends of 0.1 millimeters to 3 millimeters.

15. The method of claim 9, wherein the peripheral wall has a thickness between the first and second open ends of 0.4 millimeters to 0.8 millimeters.

\* \* \* \* \*